United States Patent [19]

von Oertzen et al.

[11] 4,105,662
[45] Aug. 8, 1978

[54] ANTRAQUINONE DYESTUFFS

[75] Inventors: Klaus von Oertzen, Cologne, Fed. Rep. of Germany; Hans Samuel Bien, deceased, late of Burscheid, Fed. Rep. of Germany, by Else Bien, legal representative; by Gabriele Bien, legal representative, Burscheid, Fed. Rep. of Germany

[73] Assignee: Bayer Aktiengesellschaft, Leverkusen, Fed. Rep. of Germany

[21] Appl. No.: 775,894

[22] Filed: Mar. 9, 1977

[30] Foreign Application Priority Data

Mar. 11, 1976 [DE] Fed. Rep. of Germany ....... 2610158

[51] Int. Cl.$^2$ ................................................. C09B 1/20
[52] U.S. Cl. ..................................... 544/294; 8/1 D; 260/374
[58] Field of Search ..................... 260/256.5 R; 8/1 D

[56] References Cited

U.S. PATENT DOCUMENTS 3,271,397  9/1966  Bitterli ........................ 260/256.5 R
3,920,632  11/1975 Hohmann et al. ............ 260/239.3 T

FOREIGN PATENT DOCUMENTS 1,170,195  11/1969  United Kingdom ..................... 544/294

Primary Examiner—Donald G. Daus
Assistant Examiner—Lisa Jones
Attorney, Agent, or Firm—Plumley and Tyner

[57] ABSTRACT

Reactive dyestuffs of the formula

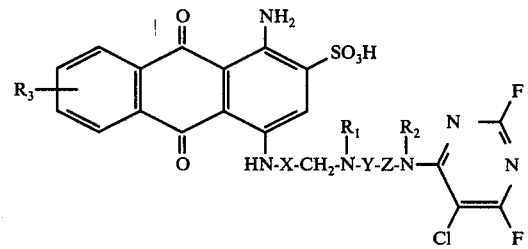

wherein $R_1$, $R_2$, $R_3$, X, Y and Z have the meaning given in the description and their use for the dyeing and printing of materials which contain hydroxyl groups and materials which contain N, such as cotton, wool and the like, by the customary processes.

4 Claims, No Drawings

ANTRAQUINONE DYESTUFFS

The present invention relates to reactive dyestuffs to the general formula

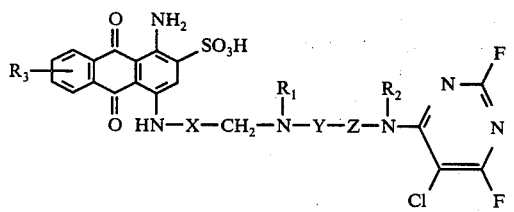 (I)

wherein
$R_1$ and $R_2$ = H or alkyl, especially $C_1$-$C_4$-alkyl,
$R_3$ = H or a sulphonic acid group,
X = optionally substituted phenylene,
Y = CO or $SO_2$ and
Z = phenylene.

Suitable radicals $R_1$ and $R_2$ are, in particular, hydrogen and methyl. Suitable phenylene radicals X are, for example, phenylene radicals substituted by sulpho and $C_1$-$C_4$-alkyl, such as

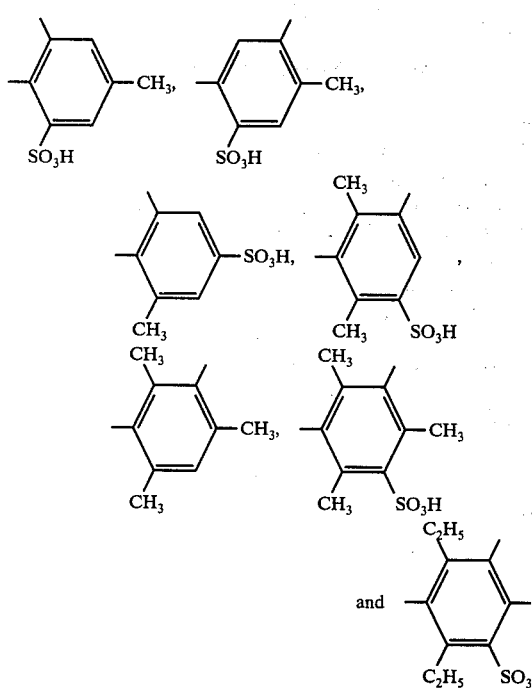

Preferred dyestuffs are those of the following formula (II)

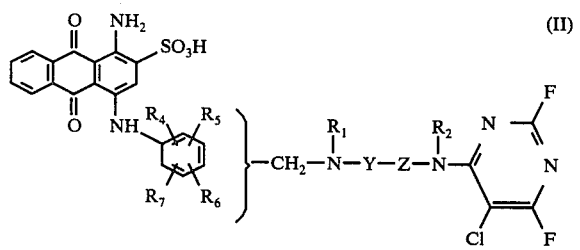 (II)

wherein $R_1$ and $R_2$ = H or alkyl,
$R_4$, $R_5$ and $R_6$ = H or alkyl,
$R_7$ = H or a sulphonic acid group,
Y = CO or $SO_2$ and
Z = phenylene and
alkyl preferably represents $C_1$-$C_4$-alkyl.

The dyestuffs can be prepared, for example, by the following route: compounds of the formula (III)

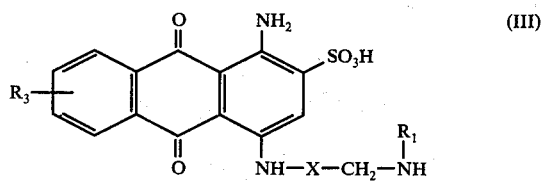 (III)

wherein
$R_1$, $R_3$ and X have the meaning indicated in formula (I), are reacted with compounds of the formula (IV)

$$W-Y-Z-NO_2 \qquad (IV)$$

wherein
W = a removable radical, especially halogen, such as Cl,
Br or F,
and wherein
Y and Z have the meaning indicated in formula (I), to give compounds of the formula (V)

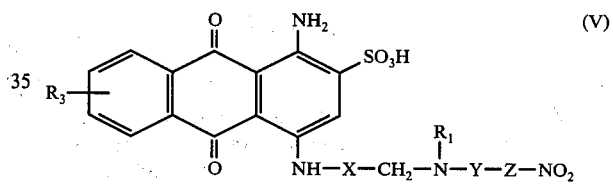 (V)

wherein
R, $R_3$, X, Y and Z have the meaning indicated in formula (I).

In the compounds of the formula (V), which are thus obtained, the nitro group is converted into an amino group in a suitable manner, for example by reduction with alkali metal salts of hydrogen sulphide or by means of hydrazine, and compounds of the formula (VI) are thus obtained.

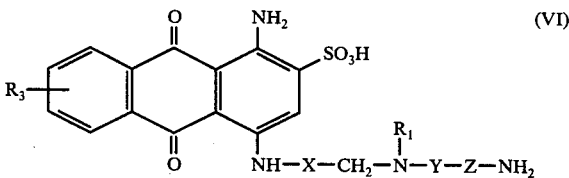 (VI)

The compounds of the formula (VI) are then reacted with 2,4,6-trifluoro-5-chloro-pyrimidine of the formula (VII)

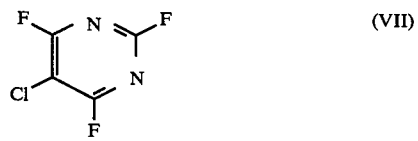 (VII)

to give the desired dyestuffs of the formula (I), in which $R_2$ = hydrogen.

The conversions of (III) to (V), of (V) to (VI) and of (VI) to (I) are carried out in water, optionally with the addition of acid amides, such as caprolactam or dimethylformamide, or of ethers, such as dioxane. The pH value can be varied from 11 to 4; the reactions are carried out in a temperature range of 0°–50° C.

Another embodiment consists in reacting compounds of the formula (VIII)

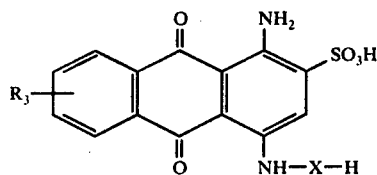
(VIII)

with compounds of the formula (IX)

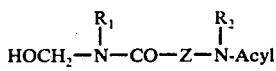
(IX)

to give compounds of the formula (X)

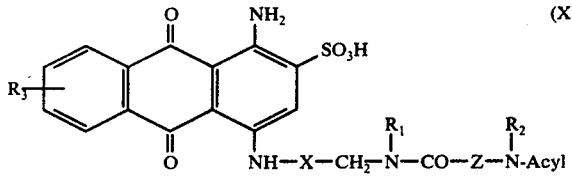
(X)

wherein $R_1$, $R_2$, $R_3$, X and Z have the meaning indicated in formula (I) and Acyl denotes an acid radical which can be split off easily, such as, for example, the radical of formic acid, that is to say —CHO.

This radical is then split off and the compounds (XI)

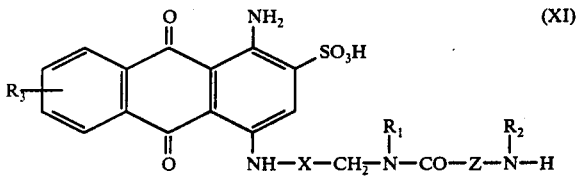
(XI)

which are thus obtained, are reacted with 2,4,6-trifluoro-5-chloro-pyrimidine of the formula (VII) to give dyestuffs of the formula (I), in which $R_1$, $R_2$, $R_3$, X and Z have the meaning indicated in that formula and

Y = CO.

The reactions of (VIII) with (IX) to give (X) are carried out in sulphuric acid which is 90–100% pure, or in oleum which contains 0–20% of free $SO_3$. The temperature can be varied from 0°–30° C.

The conversions of (X) to (XI) are effected in dilute mineral acids, such as 1–10% strength hydrochloric acid or sulphuric acid, at temperatures of 20°–40° C.

A further embodiment consists in reacting compounds of the formula (VIII) with compounds of the formula (XII)

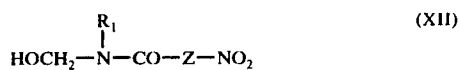
(XII)

to give compounds of the formula (XIII)

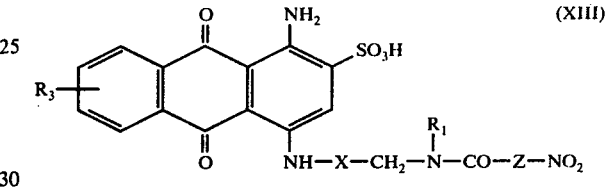
(XIII)

wherein $R_1$, $R_3$, X and Z have the meaning indicated in formula (I). The reaction conditions are the same as those for the conversion of (VIII) to (X). Compounds of the type of the formula (V) wherein

Y = CO, are obtained in this way.

The further conversions are carried out analogously to the conversion of (V) to (VI) and, subsequently, to the reaction of (VI) with (VII) to give (I).

The dyestuffs which are thus obtained correspond to the formula (I), wherein $R_1$, $R_3$, X and Z have the meaning indicated in that formula and $R_2$ = H and

Y = CO.

Particularly preferred dyestuffs are those of the formula (XIV)

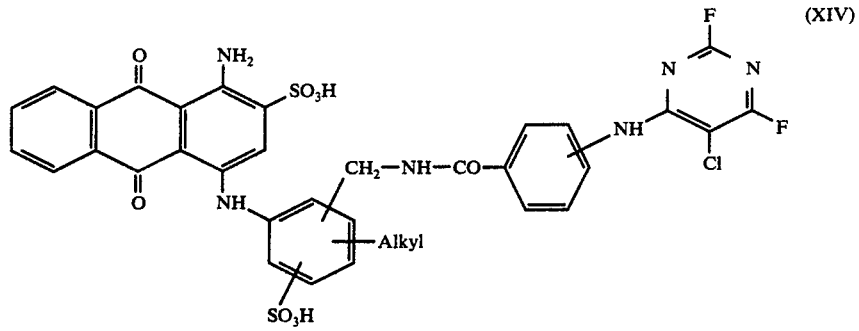
(XIV)

and, amongst these, especially those of the formula (XV)

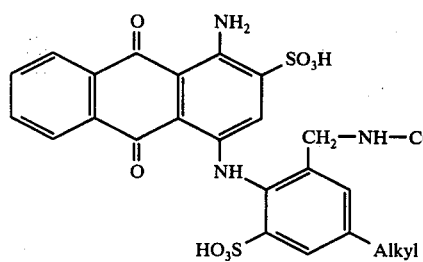
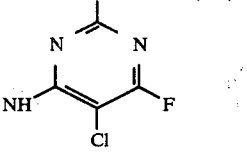
(XV)
in which formulae Alkyl = $C_1$-$C_4$-alkyl. Examples of suitable compounds of the formula (III) are
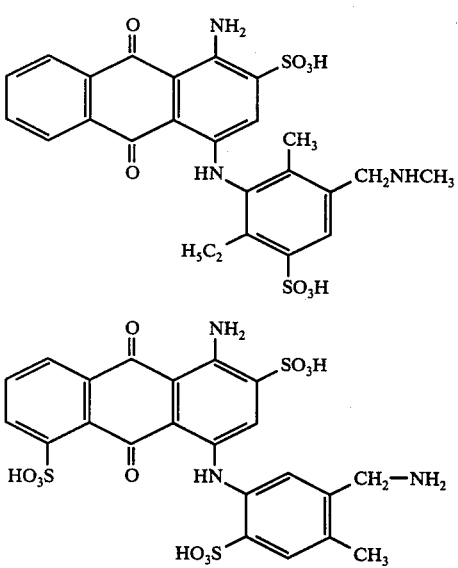
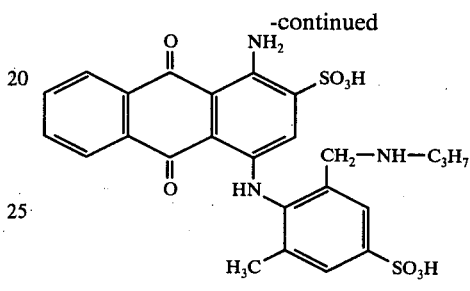
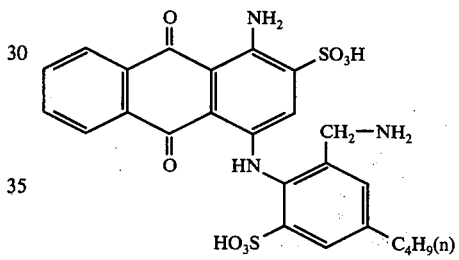
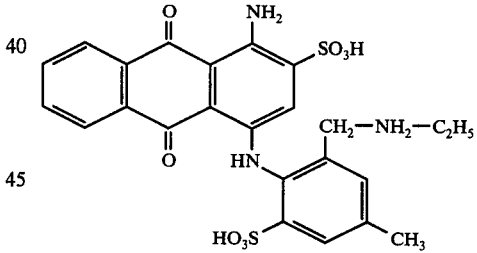
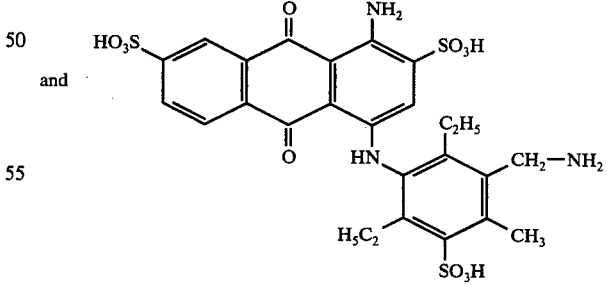
and
Examples of suitable compounds of the formula (IV) are
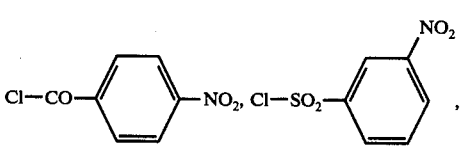

-continued
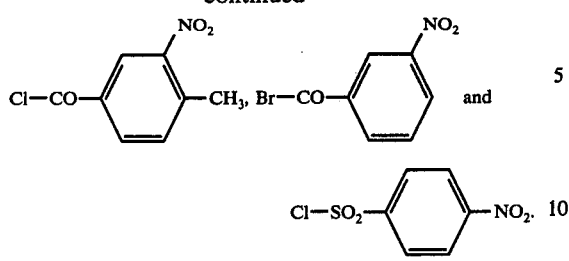 and 
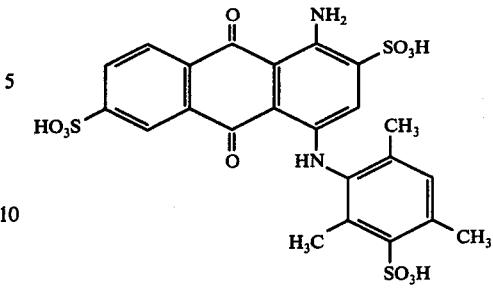
Examples of suitable compounds of the formula (VIII) are:
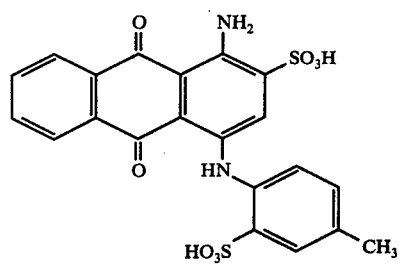
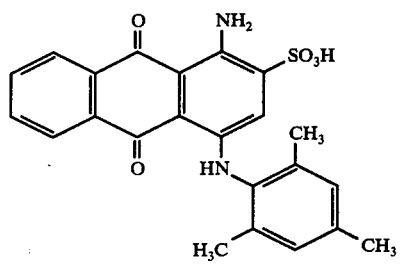
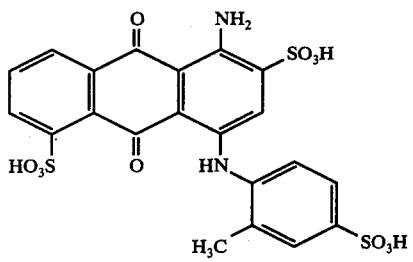
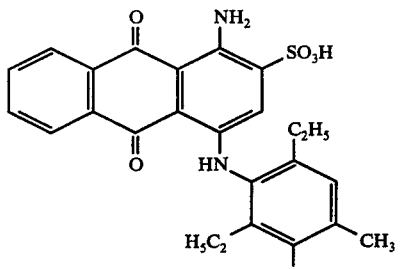
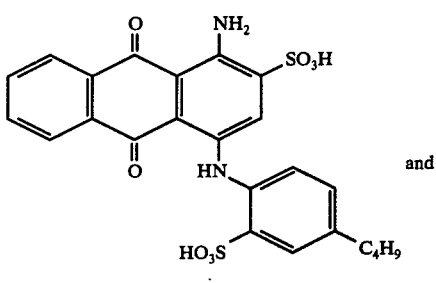 and
Examples of suitable compounds of the formula (IX) are:
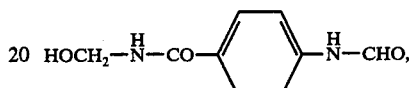
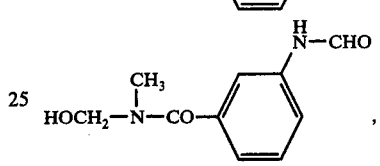
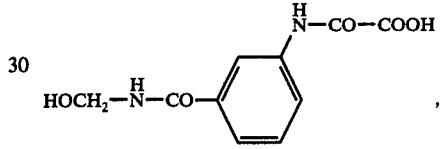
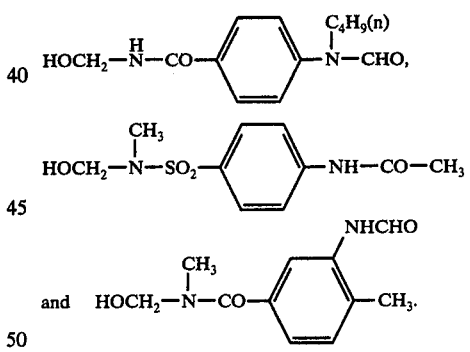
Examples of suitable compounds of the formula (XII) are:
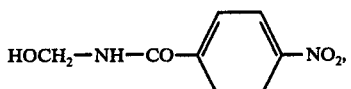
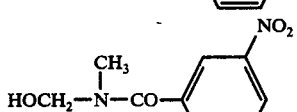
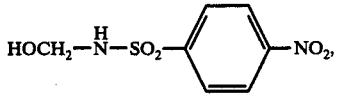

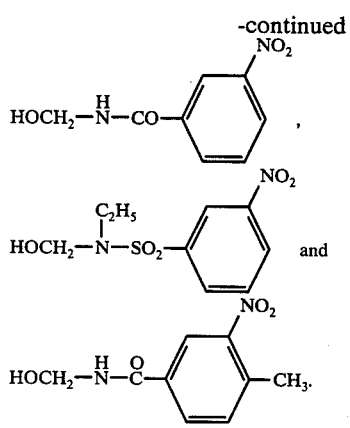

The new dyestuffs are suitable for dyeing and printing materials which contain hydroxyl groups and materials which contain N, such as cotton, wool and the like, by the customary processes.

The formulae given in the description are those of the free acids. Dyeing is generally carried out with the salts, especially the alkali metal salts and preferably the sodium salts, potassium salts or lithium salts.

with 10% strength sodium chloride solution and dried at 100°.

The starting material can be characterised by thin layer chromatography: DC-Alufolie Cellulose (aluminium foil/cellulose for thin layer chromatography) (Merck), ethyl acetate/pyridine/water, 14:5:4 (V/V/V) $r_F$ value = 0.30.

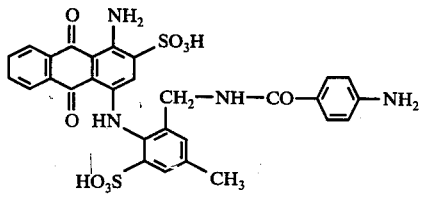

33.3 parts ($\triangleq$ 0.05 mol) of the intermediate product obtained according to 1.1, calculated as the free acid, are dissolved, in the form of the salt-containing disodium salt, in 290 parts of water at 90° C. An aqueous 18–20% strength solution of 2.95 parts ($\triangleq$ 0.525 mol) of sodium hydrogen sulphide is added dropwise at this temperature in the course of 10 minutes, the mixture is cooled to 20°–25° C and 25 parts of sodium chloride are added. After 2–3 hours, the crystals which have separated out are filtered off, washed with 10% strength NaCl solution and dried at 100°.

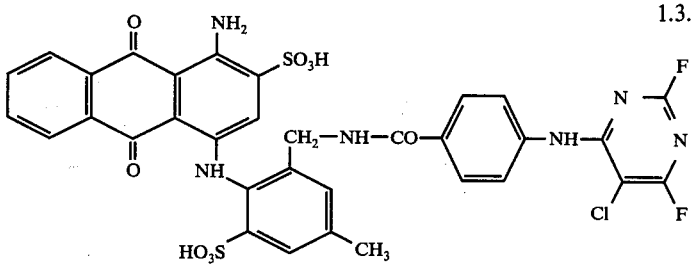

EXAMPLE 1

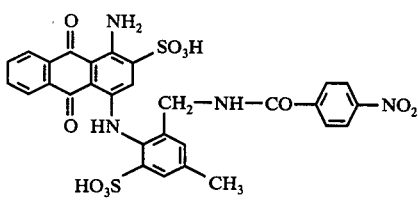

25.85 parts ($\triangleq$ 0.05 mol) of 1-amino-4-(4'-methyl-2'-aminomethyl-anilino)-anthraquinone-2,6'-disulphonic acid are stirred in 260 parts of water at 20°–25° C and brought into solution by adding about 8.5 parts of 50% strength sodium hydroxide solution. The pH value should be 8–10. 10.2 parts of 4-nitrobenzoyl chloride are added and the pH value is kept at 9–9.5 by adding 2 N sodium hydroxide solution dropwise. When the reaction has ended, the mixture is heated to 80°, in order to decompose the excess nitrobenzoyl chloride which is still present, and is cooled to 20°–25° and the product is salted out with 16 parts of sodium chloride. The product, which has crystallised well, is filtered off, washed 31.8 parts ($\triangleq$ 0.05 mol) of the intermediate product obtained according to 1.2., calculated as the free acid, are dissolved, in the form of the di-sodium salt, in 340 parts of water at 60° C. The solution is cooled to 20°–25° C. 11.4 parts ($\triangleq$ 0.068 mol) of 2,4,6-trifluoro-5-chloro-pyrimidine are added and the pH value is kept at 6–7 by adding 2 N sodium hydroxide solution dropwise. The dyestuff crystallises immediately, without the addition of salt. It is filtered off after several hours, washed with 5% strength sodium chloride solution and dried at 60°.

A clear, reddish-tinged blue dyeing is obtained on wool.

It is possible to combine reactions 1.1. and 1.2. by not salting out the product from stage 1.1 but heating it, after the reaction has ended, to 90° C, then adding sodium hydrogen sulphide solution dropwise, as described for stage 1.2., and proceeding further as indicated in stage 1.2.

The compounds which follow can also be prepared analogously to Example 1:

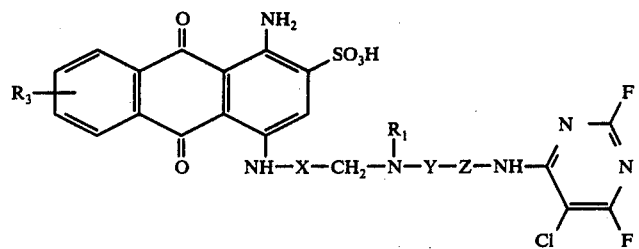

| Example | R₃ | X | R₁ | Y | Z | Colour shade on wool or cotton |
|---|---|---|---|---|---|---|
| 2 | H | 2-methyl-5-SO₃H-phenyl | H | CO | phenyl (1,3) | clear reddish-tinged blue |
| 3 | 6-SO₃H | 2-methyl-5-SO₃H-phenyl | H | CO | phenyl (1,4) | greenish-tinged blue |
| 4 | H | 2,4,6-trimethyl-3-SO₃H-phenyl | H | SO₂ | phenyl (1,3) | clear reddish-tinged blue |
| 5 | H | 2,5-dimethyl-4-SO₃H-phenyl | H | CO | phenyl (1,3) | neutral blue |
| 6 | H | 2-ethyl-6-methyl-4-SO₃H-phenyl | CH₃ | CO | phenyl (1,3) | clear reddish-tinged blue |
| 7 | H | 2,5-dimethyl-4-SO₃H-phenyl | H | SO₂ | phenyl (1,4) | clear reddish-tinged blue |
| 8 | 5-SO₃H | 2,5-dimethyl-4-SO₃H-phenyl | H | CO | phenyl (1,3) | greenish-tinged blue |
| 9 | H | 2,4,6-trimethyl-3-SO₃H-phenyl | CH₃ | CO | phenyl (1,4) | clear reddish-tinged blue |

-continued

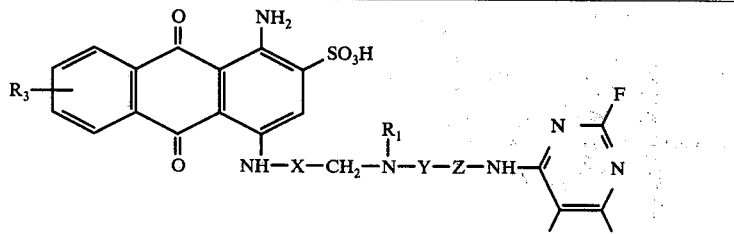

| Example | $R_3$ | X | $R_1$ | Y | Z | Colour shade on wool or cotton |
|---|---|---|---|---|---|---|
| 10 | H | 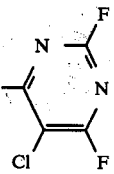 | H | CO | | clear reddish-tinged blue |

We claim:
1. Reactive dyestuff of the formula

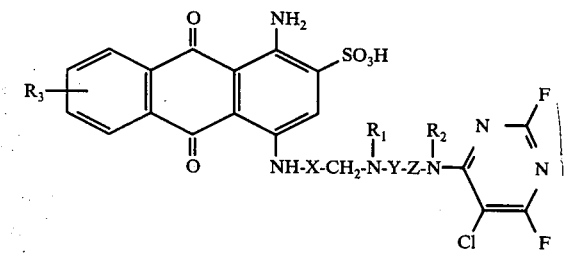

wherein
$R_1$, $R_2$ and $R_3$ are hydrogen;
X is phenylene or phenylene substituted with $C_1$-$C_4$-alkyl, with or without one sulfo groups;
Y is CO or $SO_2$; and
Z is phenylene.

2. Reactive dyestuff of the formula

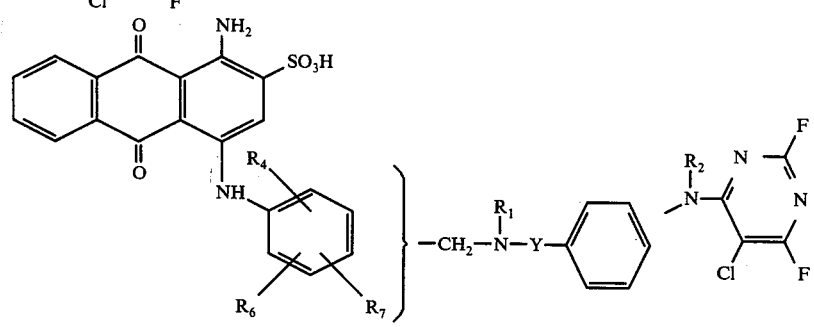

wherein
$R_1$ and $R_2$ are H;
$R_4$ is H or sulfo;
$R_5$, $R_6$ and $R_7$ are H or $C_1$-$C_4$-alkyl; and
Y is CO or $SO_2$.

3. Reactive dyestuff of the formula

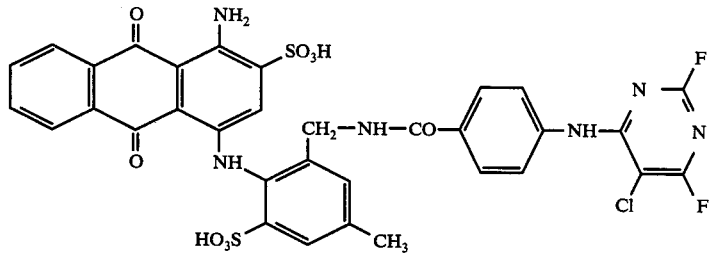

4. Reactive dyestuff of the formula

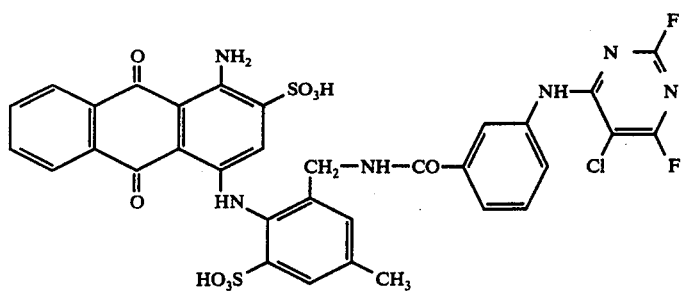
* * * * *